United States Patent
Novoplanski

(10) Patent No.: US 12,220,952 B2
(45) Date of Patent: Feb. 11, 2025

(54) RUN-FLAT AND AIRLESS TIRES

(71) Applicant: GALILEO WHEEL LTD., Mevasert Zion (IL)

(72) Inventor: Avishay Novoplanski, Moshav Beit Zait (IL)

(73) Assignee: GALILEO WHEEL LTD., Mevasert Zion (IL)

(*) Notice: Subject to any disclaimer, the term of this patent is extended or adjusted under 35 U.S.C. 154(b) by 121 days.

(21) Appl. No.: 17/775,604

(22) PCT Filed: Nov. 10, 2020

(86) PCT No.: PCT/IB2020/060576
§ 371 (c)(1),
(2) Date: May 10, 2022

(87) PCT Pub. No.: WO2021/090300
PCT Pub. Date: May 14, 2021

(65) Prior Publication Data
US 2022/0355624 A1    Nov. 10, 2022

Related U.S. Application Data

(60) Provisional application No. 62/933,458, filed on Nov. 10, 2019.

(51) Int. Cl.
*B60C 7/10*    (2006.01)
*B60C 5/00*    (2006.01)
*B60C 17/00*   (2006.01)

(52) U.S. Cl.
CPC .............. *B60C 7/107* (2021.08); *B60C 5/008* (2013.01); *B60C 17/0018* (2013.01)

(58) Field of Classification Search
CPC . B60C 17/08; B60C 17/0018; B60C 17/0009; B60C 7/22; B60C 7/107; B60C 5/008; B60C 13/02; Y10T 152/10045
(Continued)

(56) References Cited

U.S. PATENT DOCUMENTS 926,012 A * 6/1909 Motz ...................... B60C 7/107
                                                    152/324
1,237,227 A * 8/1917 Swartz .................... B60C 7/107
                                                    152/394
(Continued)

FOREIGN PATENT DOCUMENTS

GB            17478 A  *  9/1893
WO      2011104578 A2    9/2011
WO   WO-2018/055624 A1 *  3/2018

*Primary Examiner* — Jason R Bellinger
(74) *Attorney, Agent, or Firm* — Rivka Friedman

(57) ABSTRACT

A tire (10, 10') for rotation about an axis of rotation (12) has a first wall portion (14) having a partially conical form, and a second wall portion (16) integrally formed and interconnected with the first wall portion at a transition region (18) so as to define an annular recess. A closure-limiting configuration includes a number of tubular reinforcing elements (20) arrayed around the annular recess. Each tubular reinforcing element has a wall with a closed cross-section. The tubular reinforcing elements (20) are spaced around the annular recess such that deformation of a compressed region of the tire under a load causes a change in shape of the tubular reinforcing elements in the compressed region.

10 Claims, 7 Drawing Sheets

(58) Field of Classification Search
USPC ........ 152/156, 522, 247–253, 258–260, 270, 152/275–277, 324, 326
See application file for complete search history.

(56) References Cited

U.S. PATENT DOCUMENTS

| | | | | |
|---|---|---|---|---|
| 1,445,768 A * | 2/1923 | Hulse | ...................... | B60C 7/107 152/324 |
| RE15,872 E * | 7/1924 | Brubaker | ................ | B60C 7/107 152/324 |
| 1,560,551 A * | 11/1925 | Ernst | ...................... | B60C 7/107 152/324 |
| 1,574,499 A * | 2/1926 | Marshall | ................ | B60C 7/107 152/324 |
| 1,616,843 A * | 2/1927 | Brubaker | ................ | B60C 7/107 152/324 |
| 1,624,856 A * | 4/1927 | Bauman | ................... | B60C 7/14 152/326 X |
| 1,641,150 A * | 9/1927 | Brubaker | ................ | B60C 7/107 152/324 |
| 1,662,007 A * | 3/1928 | Kuhlke | .................. | B60C 7/107 152/324 |
| 3,372,726 A | 3/1968 | Sidles | | |
| 3,901,300 A * | 8/1975 | Toplis | ................... | B29D 30/02 152/246 |
| 4,998,980 A * | 3/1991 | Katou | ..................... | B60C 7/107 152/324 |
| 5,139,066 A * | 8/1992 | Jarman | ................. | B60C 17/061 152/324 |
| 6,719,027 B1 * | 4/2004 | Chen | ....................... | B60C 7/107 152/5 |
| 8,276,628 B2 * | 10/2012 | Hanada | ................. | B60C 17/061 152/157 |
| 8,826,953 B2 * | 9/2014 | Pringiers | .................. | B60C 7/24 152/323 |
| 11,731,458 B2 * | 8/2023 | Sgreccia | ................ | B60C 7/107 152/324 |
| 2002/0092589 A1 * | 7/2002 | Katoh | ................... | B29D 30/02 152/157 |
| 2007/0029020 A1 * | 2/2007 | Wietharn | ............ | B60C 11/0311 152/324 |
| 2007/0215259 A1 * | 9/2007 | Burns | .................... | B60C 7/107 152/302 |
| 2012/0234444 A1 * | 9/2012 | Palinkas | ................... | B60C 7/22 152/246 |
| 2013/0276968 A1 * | 10/2013 | Moore | .................. | B29D 30/02 156/245 |
| 2015/0144239 A1 * | 5/2015 | Hiscock | .................... | B60B 9/10 152/209.1 |

* cited by examiner

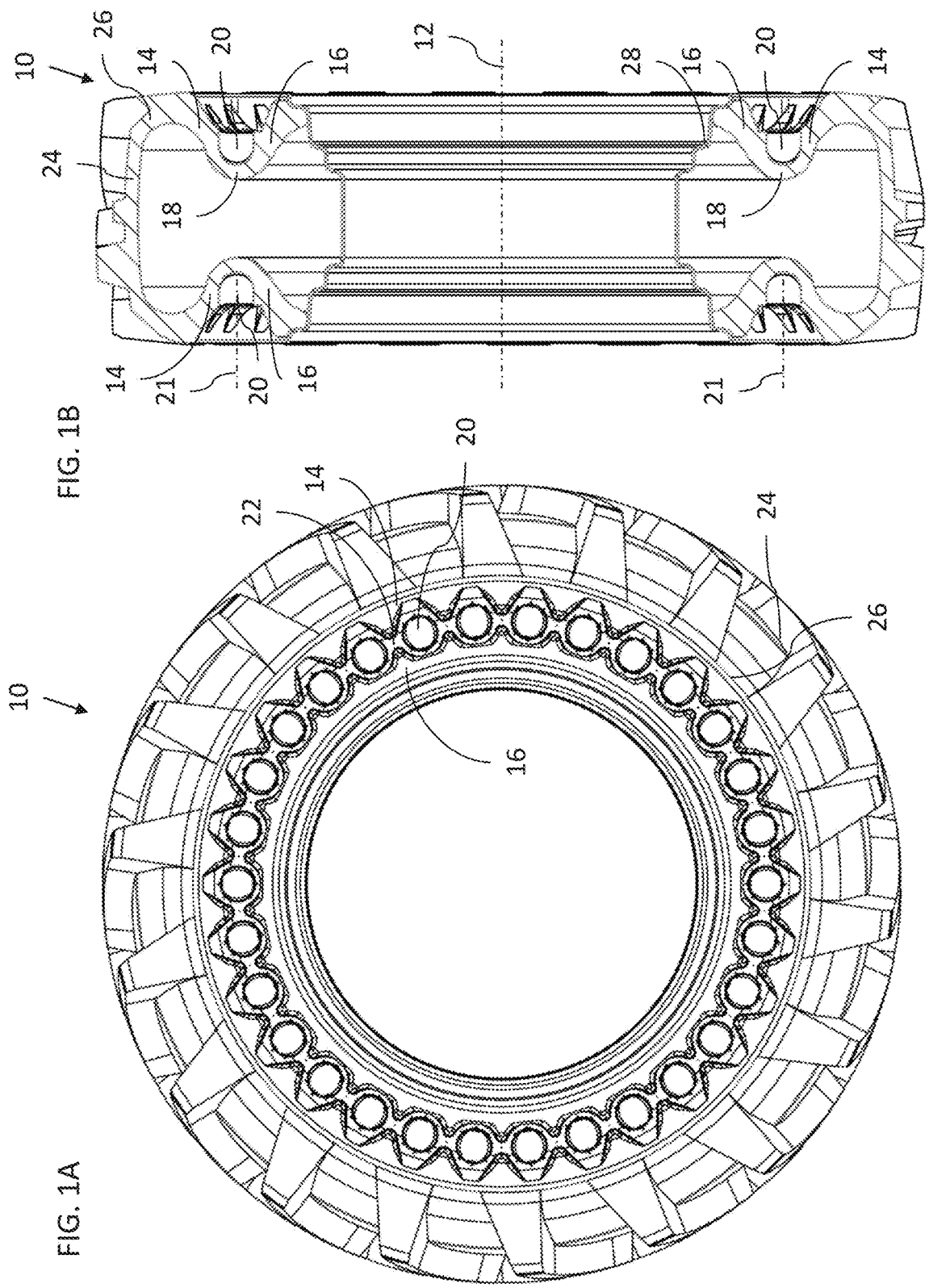

RUN-FLAT AND AIRLESS TIRES

FIELD AND BACKGROUND OF THE INVENTION

The present invention relates to tires for vehicles, and in particular, to a tire with features to facilitate proper function of the tire without internal air pressure, either as a run-flat option for a pneumatic tire or as an implementation of an airless tire.

Patent publications WO 2018/055624, WO 2013/014676 and WO 2011/092709 disclose various tires or wheel assemblies in which the sidewalls have a V-shaped cross-sectional profile defining an annular recess between a radially-inner conical surface and a radially-outer conical surface.

SUMMARY OF THE INVENTION

The present invention is a tire with a closure-limiting configuration for limiting folding of regions of the tire onto itself under stress.

According to the teachings of an embodiment of the present invention there is provided, a tire for rotation about an axis of rotation comprising: (a) a first wall portion having a partially conical form circumscribing the axis; (b) a second tire portion have a partially conical or a cylindrical form, circumscribing the axis, the first wall portion and the second tire portion being integrally formed with each other and interconnected at a transition region so as to define an annular recess adjacent to the transition region; and (c) a closure-limiting configuration comprising a plurality of tubular reinforcing elements arrayed around the annular recess, each of the tubular reinforcing elements having a wall with a closed cross-section, the tubular reinforcing elements being spaced around the annular recess such that deformation of a compressed region of the tire under a load causes a change in shape of the tubular reinforcing elements in the compressed region.

According to a further feature of an embodiment of the present invention, in an unstressed form of the tire, the wall of a first of the tubular reinforcing elements is spaced from the wall of an adjacent one of the tubular reinforcing elements.

According to a further feature of an embodiment of the present invention, under a first load, a dimension of the tubular reinforcing elements in a circumferential direction of the tire increases in the compressed region of the tire and, during further loading of the tire greater than the first load, further increase in the dimension of the tubular reinforcing elements in a circumferential direction of the tire is opposed by abutment between the tubular reinforcing elements.

According to a further feature of an embodiment of the present invention, the tubular reinforcing elements have an extensional direction oriented substantially parallel to the axis of rotation of the tire.

According to a further feature of an embodiment of the present invention, each of the tubular reinforcing elements has a closed end integrated with the transition region and an open end.

According to a further feature of an embodiment of the present invention, the tubular reinforcing elements in an unstressed state of the tire are substantially cylindrical.

According to a further feature of an embodiment of the present invention, the tubular reinforcing elements in an unstressed state of the tire have a substantially polygonal cross-section.

According to a further feature of an embodiment of the present invention, a plurality of bridging elements interconnect the tubular reinforcing elements.

According to a further feature of an embodiment of the present invention, the first wall portion and the second tire portion are first and second portions of a sidewall of the tire.

According to a further feature of an embodiment of the present invention, there is also provided: (a) a tread integrally formed with the first wall portion and interconnected at a shoulder region so as to define a second annular recess adjacent to the shoulder region; and (b) a second closure-limiting configuration comprising a plurality of tubular reinforcing elements arrayed around the second annular recess, each of the tubular reinforcing elements having a wall with a closed cross-section, the tubular reinforcing elements being spaced around the second annular recess such that deformation of a compressed region of the tire under a load causes a change in shape of the tubular reinforcing elements in the compressed region.

According to a further feature of an embodiment of the present invention, the second tire portion is a tread of the tire.

According to a further feature of an embodiment of the present invention, the tire is integrally formed from reinforced rubber.

According to a further feature of an embodiment of the present invention, the tire is a pneumatic tire.

According to a further feature of an alternative embodiment of the present invention, the tire is an airless tire.

There is also provided, according to an embodiment of the present invention, a tire for rotation about an axis of rotation comprising: (a) a first wall portion having a partially conical form circumscribing the axis; (b) a second wall portion have a partially conical form circumscribing the axis, the first and second wall portions being integrally formed with each other and interconnected at a transition region so as to define an annular recess adjacent to the transition region; and (c) a closure-limiting configuration comprising a plurality of tubular reinforcing elements arrayed around the annular recess, each of the tubular reinforcing elements having a wall with a closed cross-section, the tubular reinforcing elements being spaced around the annular recess such that deformation of a compressed region of the tire under a load causes a change in shape of the tubular reinforcing elements in the compressed region.

According to a further feature of an embodiment of the present invention, there is also provided: (a) a tread integrally formed with the first wall portion and interconnected at a shoulder region so as to define a second annular recess adjacent to the shoulder region; and (b) a second closure-limiting configuration comprising a plurality of tubular reinforcing elements arrayed around the second annular recess, each of the tubular reinforcing elements having a wall with a closed cross-section, the tubular reinforcing elements being spaced around the second annular recess such that deformation of a compressed region of the tire under a load causes a change in shape of the tubular reinforcing elements in the compressed region.

There is also provided, according to an embodiment of the present invention, a tire for rotation about an axis of rotation comprising: (a) a first wall portion having a partially conical form circumscribing the axis; (b) a tread integrally formed with the first wall portion and interconnected with the first wall portion at a shoulder region so as to define an annular recess adjacent to the shoulder region; and (c) a closure-limiting configuration comprising a plurality of tubular reinforcing elements arrayed around the annular recess, each of the tubular reinforcing elements having a wall with a closed cross-section, the tubular reinforcing elements being spaced around the annular recess such that deformation of a compressed region of the tire under a load causes a change in shape of the tubular reinforcing elements in the compressed region.

BRIEF DESCRIPTION OF THE DRAWINGS

The invention is herein described, by way of example only, with reference to the accompanying drawings, wherein:

FIG. 1A is a side view of a tire, constructed and operative according to the teachings of an embodiment of the present invention;

FIG. 1B is a cross-sectional view taken through an axis of rotation of the tire of FIG. 1A mounted on a wheel rim to form a wheel assembly;

DESCRIPTION OF THE PREFERRED EMBODIMENTS

Figure 1C:
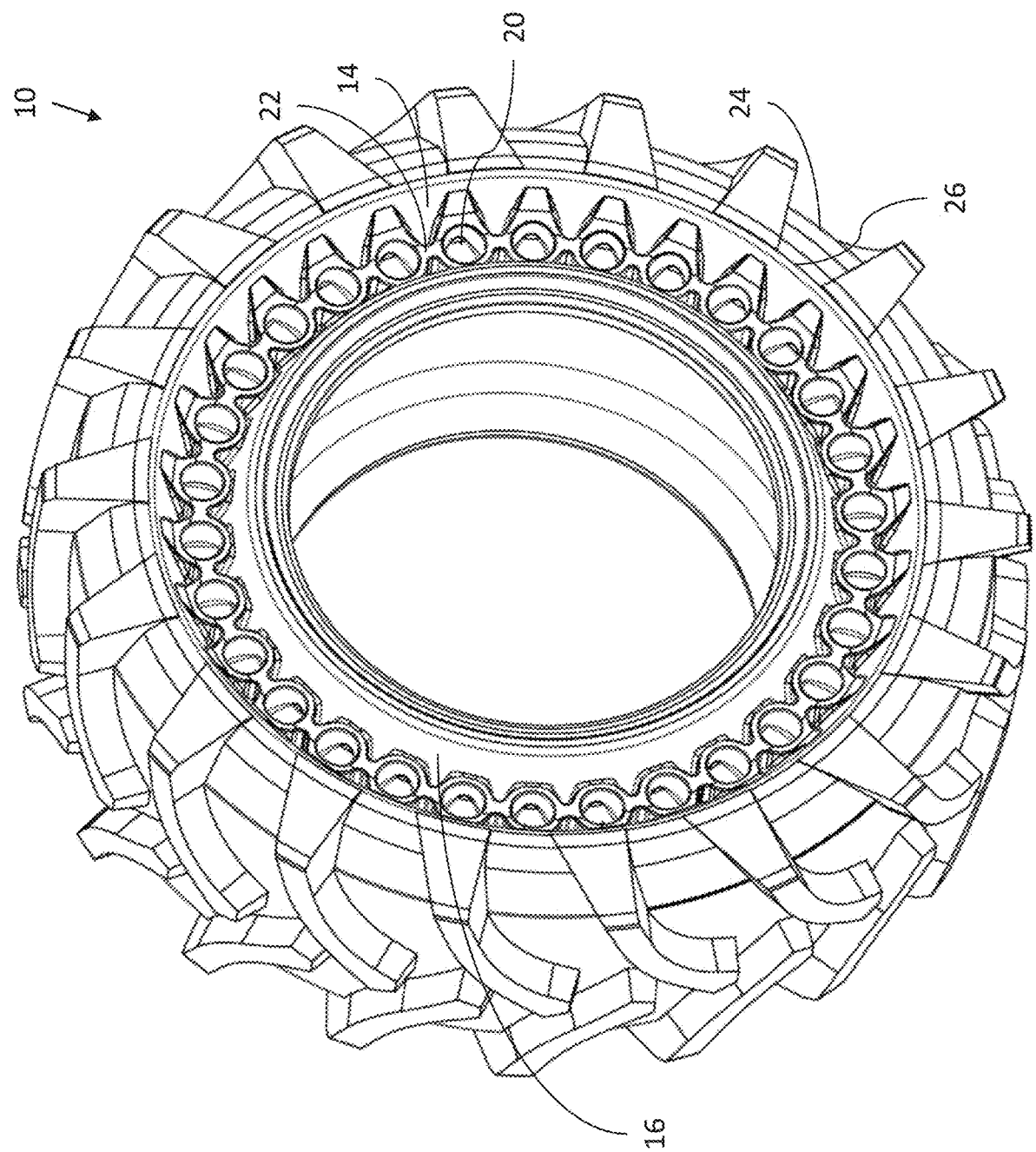
FIG. 1C is an isometric view of the tire of FIG. 1A.

The present invention is a tire with a closure-limiting configuration for limiting folding of regions of the tire onto itself under stress.

The principles and operation of tires according to the present invention may be better understood with reference to the drawings and the accompanying description.

Referring now to the drawings, FIG. 1A-7B illustrate the structure and function of tires, constructed and operative according to certain aspects of the present invention.

In general terms, certain preferred embodiments of the present invention relate to tires and corresponding wheel assemblies which have a partially-conical first wall portion, circumscribing an axis of rotation of the tire, and bordering another tire portion. The two tire portions are integrally formed and interconnected at a transition region so as to define an annular recess adjacent to the transition region that circumscribes the tire axis. A closure-limiting configuration is deployed along this annular recess so as to limit closure of the tire portions towards each other under a load. The closure-limiting configuration preferably includes a plurality of tubular reinforcing elements arrayed around the annular recess. Each tubular reinforcing element has a wall with a closed cross-section, typically round or polygonal in form. The tubular reinforcing elements are spaced around the annular recess such that deformation of a compressed region of the tire under a load causes a change in shape of the tubular reinforcing elements in the compressed region.

One particularly important but non-limiting subgroup of implementations of the present invention is in the context of tires having a sidewall with a V-shaped cross-sectional profile defining an annular recess in the sidewall of the tire, circumscribing the axis of the wheel. The V-shaped cross-sectional profile preferably corresponds to an annular recess between a radially-inner conical surface and a radially-outer conical surface. Examples of such tire structures may be found in patent publications WO 2018/055624, WO 2013/014676 and WO 2011/092709, which are hereby incorporated by reference in their entirety as if wholly set out herein.

When such a tire is placed under a load, the sides of the V-shaped recess tend to come closer to each other and the angle between them is reduced. In the case of a pneumatic tire with internal air pressure, the air pressure limits the degree to which the sides of the recess can come together, but where pressure is reduced, such as through intentional pressure reduction where enhanced traction is needed, or when pressure is lost through puncturing of the tire, or where it is desired to work with an airless tire, the deformation occurring at the root of the V-shaped recess during rolling deformation of the tire and mechanical rubbing between the two sides of the recess may result in rapid deterioration of the tire.

To address this issue, according to an aspect of the present invention, a closure-limiting structure is located within the annular recess so as to provide enhanced resistance to closing together of the sides of the recess, and thereby reducing the aforementioned wear and deterioration of the tire. A particularly preferred implementation of the closure-limiting structure is a sequence of tubular elements having closed shapes, preferably circles or polygons, which are arrayed around the recess, within the recess, and which have the property of tending to expand in a first direction when compressed in a second direction perpendicular to the first direction. A principle of operation according to one aspect of the invention is illustrated schematically in FIGS. 2A and 2B. FIG. 2A shows a starting configuration in which a series of circular closed forms are arrayed around an annular space between an inner and an outer wall. In an unstressed state as shown in FIG. 2A, there is optionally a small gap between the walls of the circular closed forms.

When radial load is applied between the inner and outer walls, the circular closed forms in the region of the load become radially compressed (squashed) and, as a result, expand (become elongated or transform from a more circular shape to an elliptical/oval shape) in a peripheral direction. In certain particularly preferred implementations, the spacing of the elongated shapes may be such that they close any gaps between the shapes and press against each other, thereby providing enhanced resistance to further compression and maintaining a spacing between the inner and outer walls.

Although illustrated as circular closed forms, other shapes can clearly be used, including but not limited to, hexagonal shapes and other regular or irregular polygonal forms. The "closed shapes" referred to herein are typically open-ended hollow prisms, meaning that they have a roughly constant cross-section corresponding to a hollow implementation of the "closed shape", and extend along an axis which is typically oriented roughly parallel (for example, within ±20 degrees) to the central axis of the tire. Such a range of angles for the preferred orientation of the extensional direction of the closed shape prisms is applicable to any and all of the variants illustrated herein. Thus, in the illustrated example of circular closed shapes, the form of the closed shapes is effectively roughly cylindrical. Although illustrated with a roughly uniform cross-section, progressively varying dimensions of the closed shape, for example with a slight conical angle, may be used to provide a progressively increasing degree of support as progressively more of the length of the form presses against the neighboring forms as the load increases. The mechanical properties can also be modified by providing a variable thickness of the walls of the closed shape.

The wall thickness of the closed shapes is chosen, taking into consideration also the properties of the material, to provide the desired amount of support to the annular recess under the range of loads for which the tire is designed.

The closure limiting structure is preferably permanently integrated with the tire. It is typically integrally molded with the tire during manufacture, from the same material as the bulk of the tire, or from a different material, and it can be integral with the bulk of the tire or added later on and be connected to its place by mechanical attachment, such as by bolts, screws, rivets or can be bonded by glue, heat or any other conventional bonding technique, and may be with or without internal reinforcing elements. However, closure-limiting structures which are formed from different structural materials and/or formed separately from the manufacture of the tire and subsequently attached thereto, by any suitable attachment technique, also fall within the scope of the present invention. Where integrally formed with the tire, an underlying region of the tire wall may seal one end of the closed shape prisms, effectively forming cup-like closed elements which are closed at one end.

The remaining drawings illustrate non-limiting but particularly preferred implementations of the tire and wheel assembly of the present invention, based closely on the tire structure disclosed in PCT patent publication no. WO 2018/055624 (hereafter "the '624 publication) but with the annular recess modified to employ the closure-limiting structure disclosed herein. The '624 publication is hereby incorporated by reference in its entirety as if fully set out herein. All features of preferred implementations of the present invention may be implemented according to the teachings of the '624 publication except where explicitly stated otherwise herein, or where clearly requiring modification in order to implement the teachings of the present invention, as will be clear to one ordinarily skilled in the art.

Thus, referring to FIGS. 1A-1C and 3A-5C, there is shown a tire, generally designated 10, for rotation about an axis of rotation 12, including a first wall portion 14 having a partially conical form circumscribing the axis, and a second wall portion 16 have a partially conical form circumscribing the axis. First and second wall portions 14 and 16 are integrally formed with each other and interconnected at a transition region 18 so as to define an annular recess adjacent to transition region 18. A closure-limiting configuration includes a number of tubular reinforcing elements 20 arrayed around the annular recess. Each of the tubular reinforcing elements 20 has a wall with a closed cross-section, preferably defining an extensional direction 21 along a length of the hollow element. The tubular reinforcing elements 20 are spaced around the annular recess such that deformation of a compressed region of the tire under a load causes a change in shape of the tubular reinforcing elements in the compressed region.

The phrase "partially conical form" is used herein in the description and claims to refer to any surface of revolution about the tire axis of rotation which differs significantly from both a radial surface and a cylindrical surface, i.e., extending in a direction oblique to the axis of rotation. The partially conical form need not have a well-defined angle of inclination to the axis of rotation, and may have curvature and/or various surface features which make it visually look unlike a geometrical "cone". The partially conical form is characterized primarily by the fact that two such adjacent forms with inclination in opposite directions, or one such form together with an adjacent cylindrical tread 24, define between them an annular recess, within which the closure-limiting configuration of the present invention is implemented.

FIGS. 1A and 1C illustrate a tire implemented according to the teachings of an embodiment of the present invention, while FIG. 1B shows a wheel assembly including a wheel fitted with the tire. FIGS. 3A-5C are various views illustrating the wheel assembly with various degrees of loading and corresponding compression.

Figure 2B:
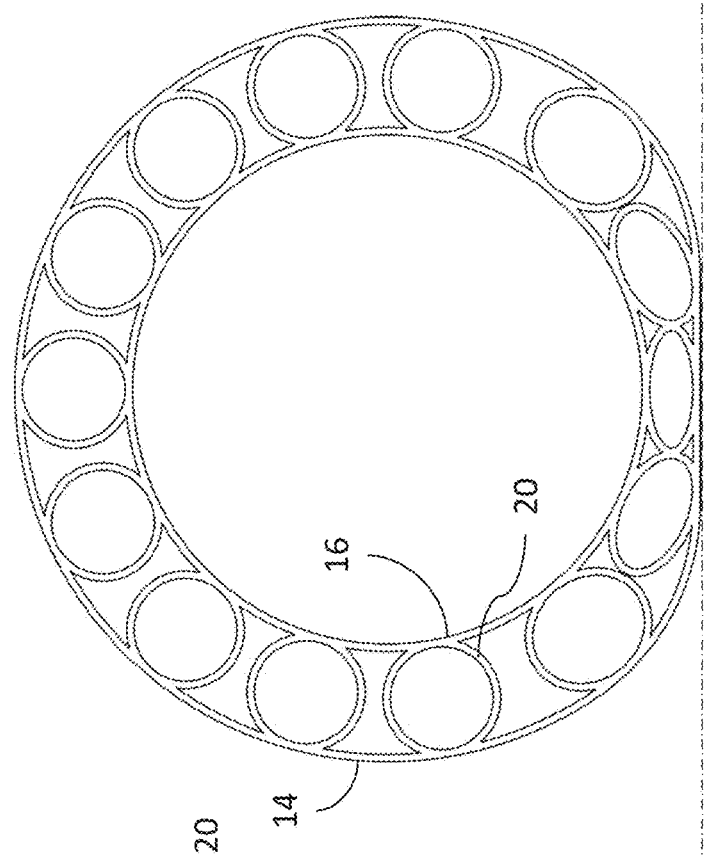
FIGS. 2A and 2B are schematic representations illustrating an aspect of the present invention that employs tubular reinforcing elements between inner and outer regions of a tire, the illustrations representing an unloaded and a loaded state, respectively.
Figure 2A:
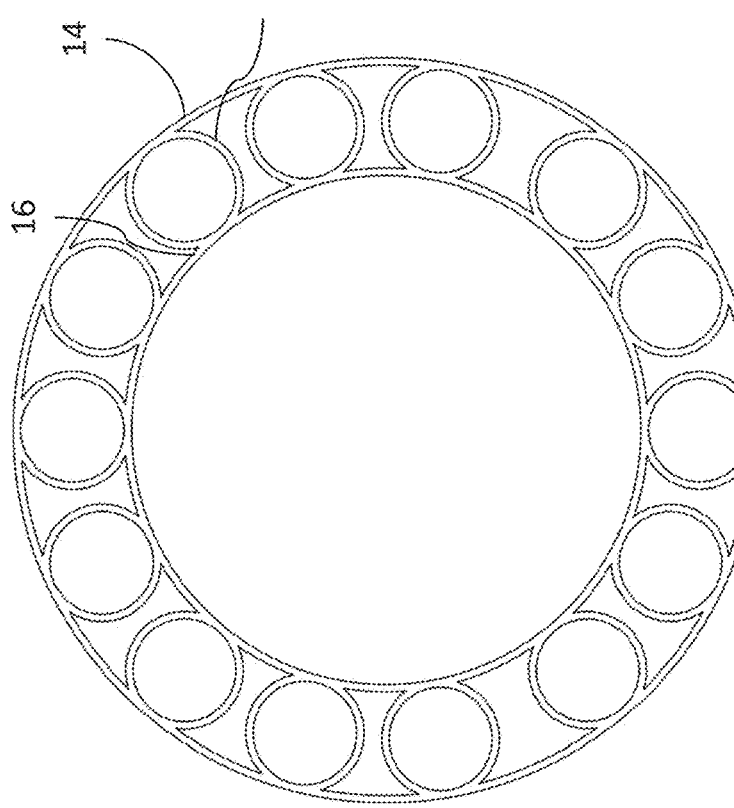

It will be noted that, unlike the schematic illustration of FIGS. 2A and 2B, the implementation illustrated here includes relatively small bridging regions 22 which interconnect adjacent circular closed shapes in the non-deformed state. These bridging portions are relatively small, and may provide some enhanced initial resistance to compression under load. The connections formed by the bridging portions also help to prevent frictional rubbing of the external surfaces of the tubular reinforcing elements 20 as they undergo the relatively complex deformation and rotation that occurs during operation of the wheel assembly, as will be described below. The operating principles of implementations with the bridging portions and without the bridging portions are otherwise similar.

For a pneumatic tire with two sidewalls mounted on a wheel rim 28, the structure of the two sidewalls, including the closure-limiting configuration, are preferably similar, with similar tubular elements on each sidewall.

It should be noted that the use of tubular reinforcing elements may provide one or more of a number of distinct advantages over other flexible supporting structures. Without in any way limiting the scope of the present invention, in order to provide a fuller understanding of certain of these advantages, reference is made here to what are believed to be the mechanisms underlying some of those advantages. It should be noted however that the efficacy of the present invention has been observed, independent of whether any theoretical basis discussed below is found to be accurate, and the invention is of utility and value independent of this analysis.

Figure 7A:
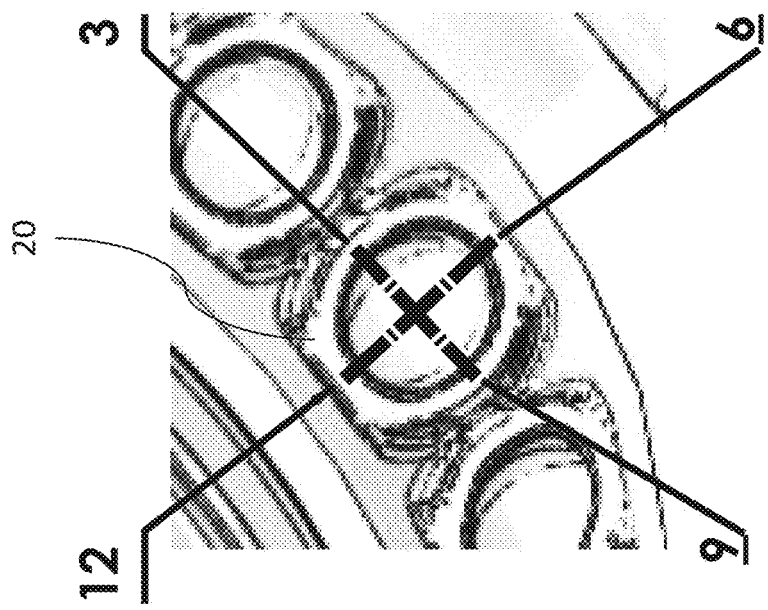
FIG. 7A is an enlarged view of a tubular reinforcing element from FIG. 3B with annotations.

FIG. 7A shows an enlarged view of a tubular reinforcing element which has been annotated with dash-dot lines indicating an orientation of the tubular reinforcing element. Specifically, using clock-directions for reference, a first line is indicated as extending from 12-to-6 (i.e., 12 o'clock or "upwards" to 6 o'clock or "downwards"), and a second line is indicated as extending from 3-to-9 (i.e., 3 o'clock or "right" to 9 o'clock or "left"). These lines are taken to define wall regions of the tubular element that correspond, in an undeformed state, to a radial direction and a circumferential direction in the tire. Thus, for the undeformed state of FIGS. 1A-1C, 12 o'clock is aligned towards axis of rotation 12, 6 o'clock points away from the axis, and 3 and 6 o'clock are aligned perpendicular to the radial direction and tangential to a circumferential direction.

Figure 3A:
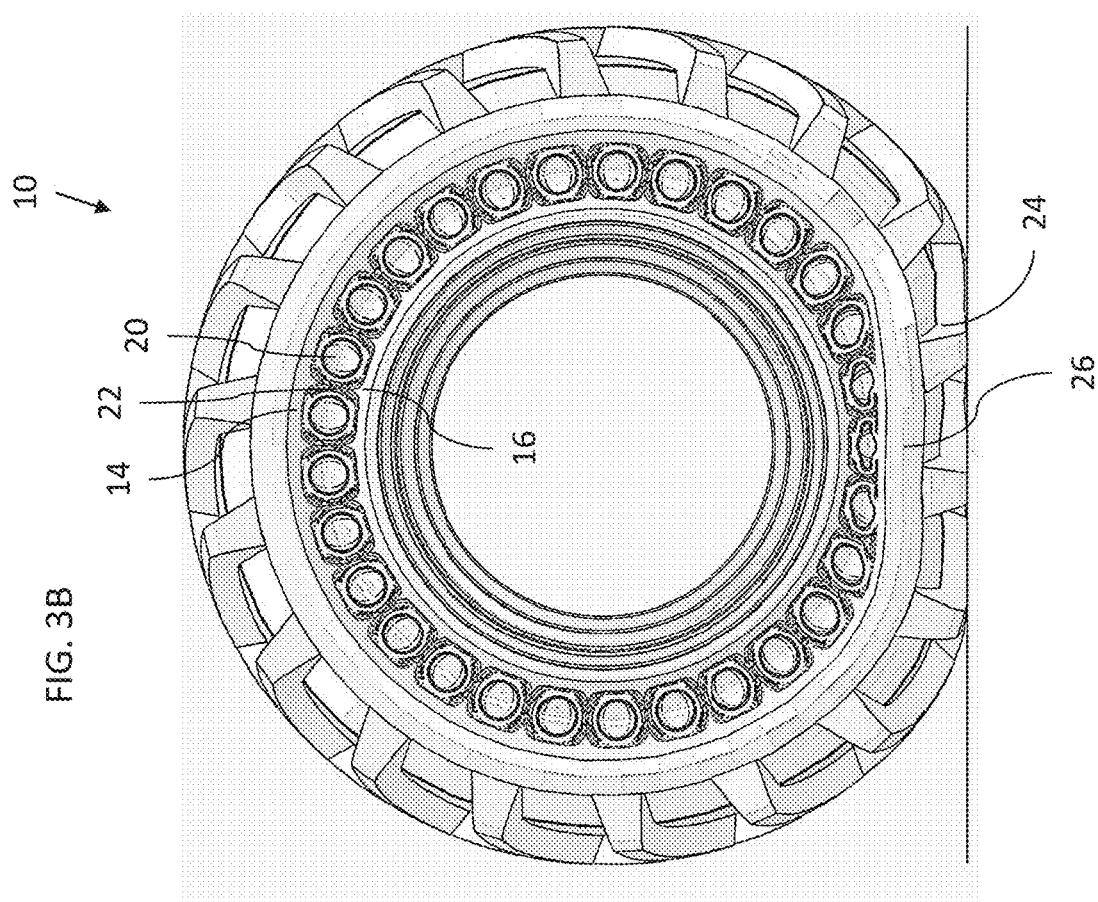
FIGS. 3A and 3B are side views similar to FIG. 1A showing the tire under conditions of medium and high load, respectively.
Figure 3B:
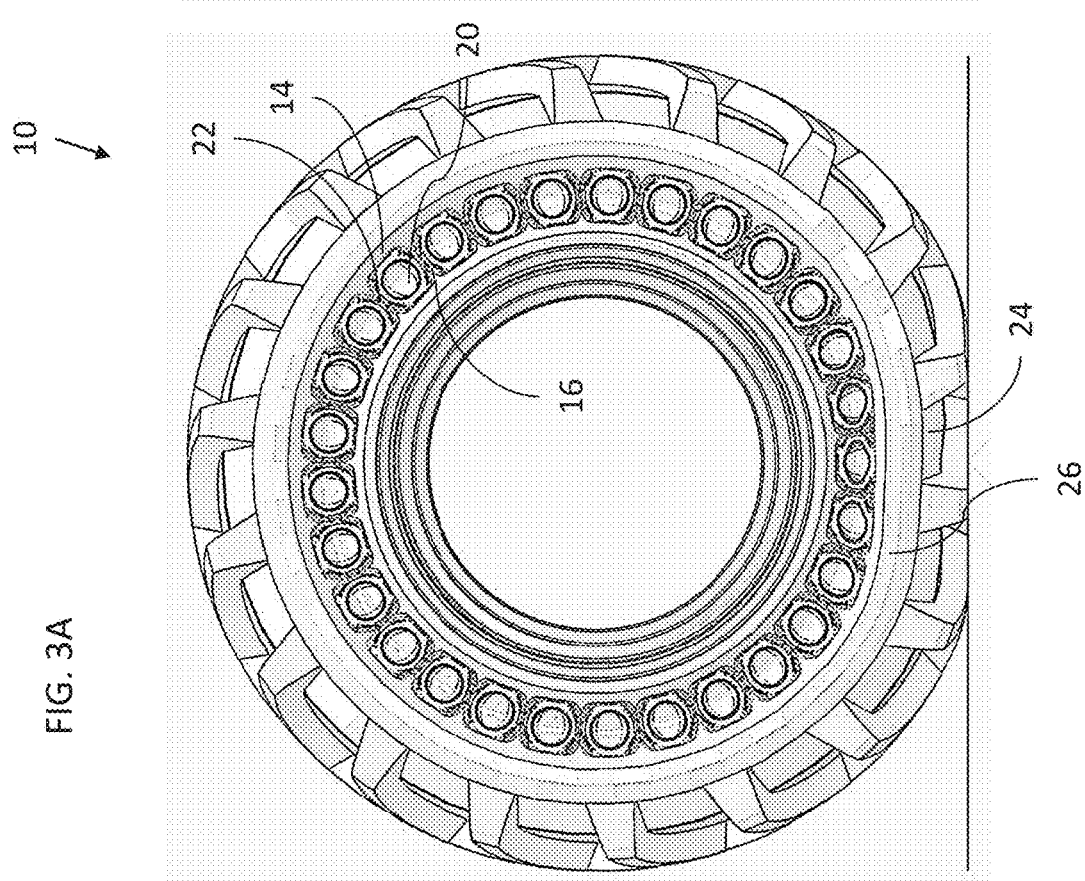
Figure 4A:
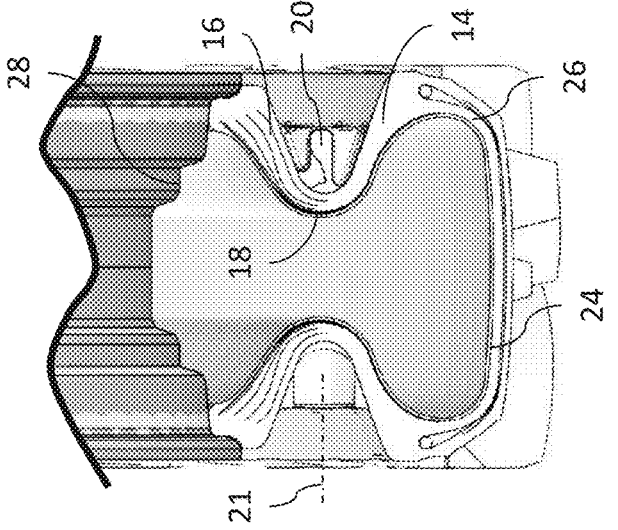
FIGS. 4A-4C are partial views similar to the lower part of FIG. 1B showing the tire unloaded and under conditions of medium and high load, respectively.
Figure 4B:
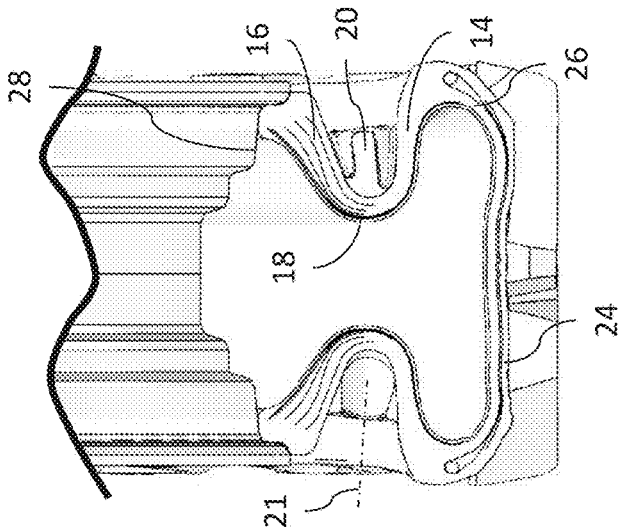
Figure 4C:
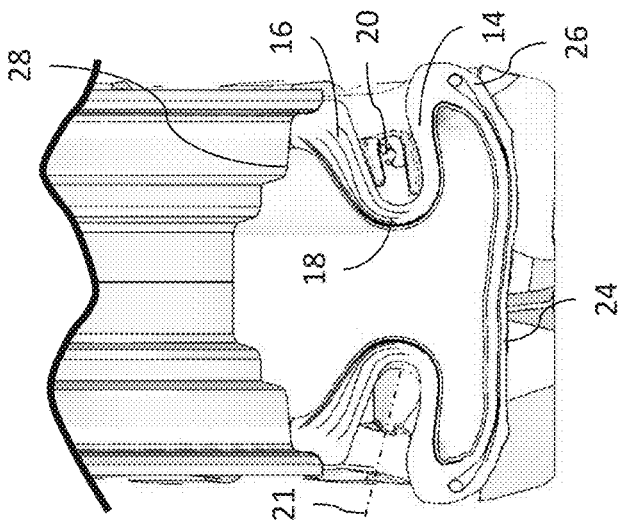
Figure 5A:
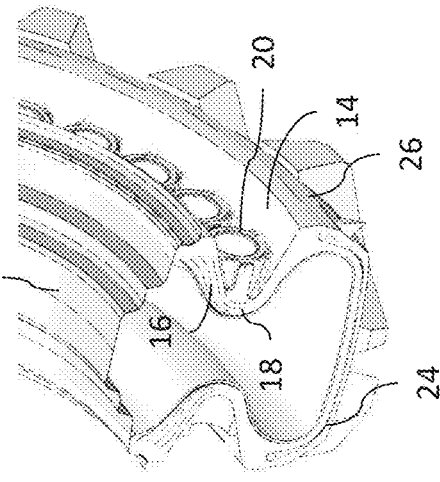
FIGS. 5A-5C are partial isometric views similar to FIGS. 4A-4C, respectively.
Figure 5B:
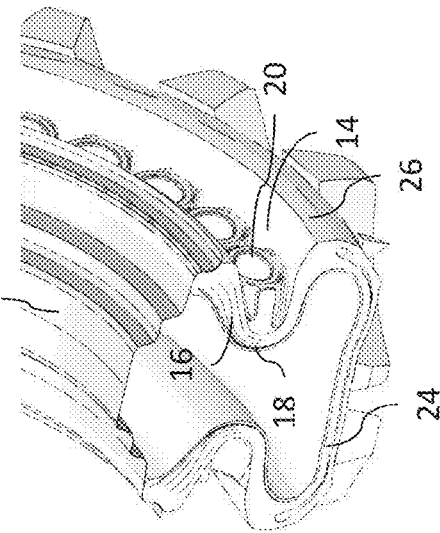
Figure 5C:
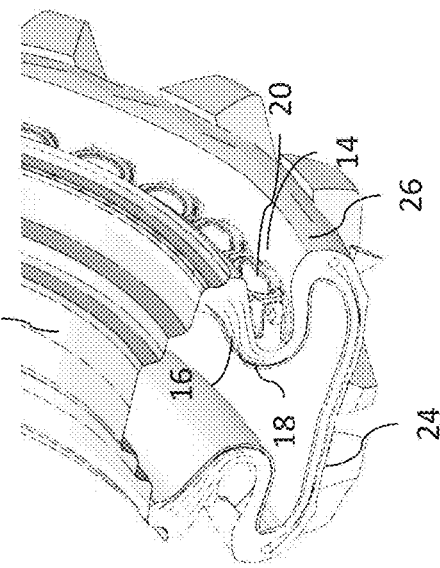
Figure 7B:
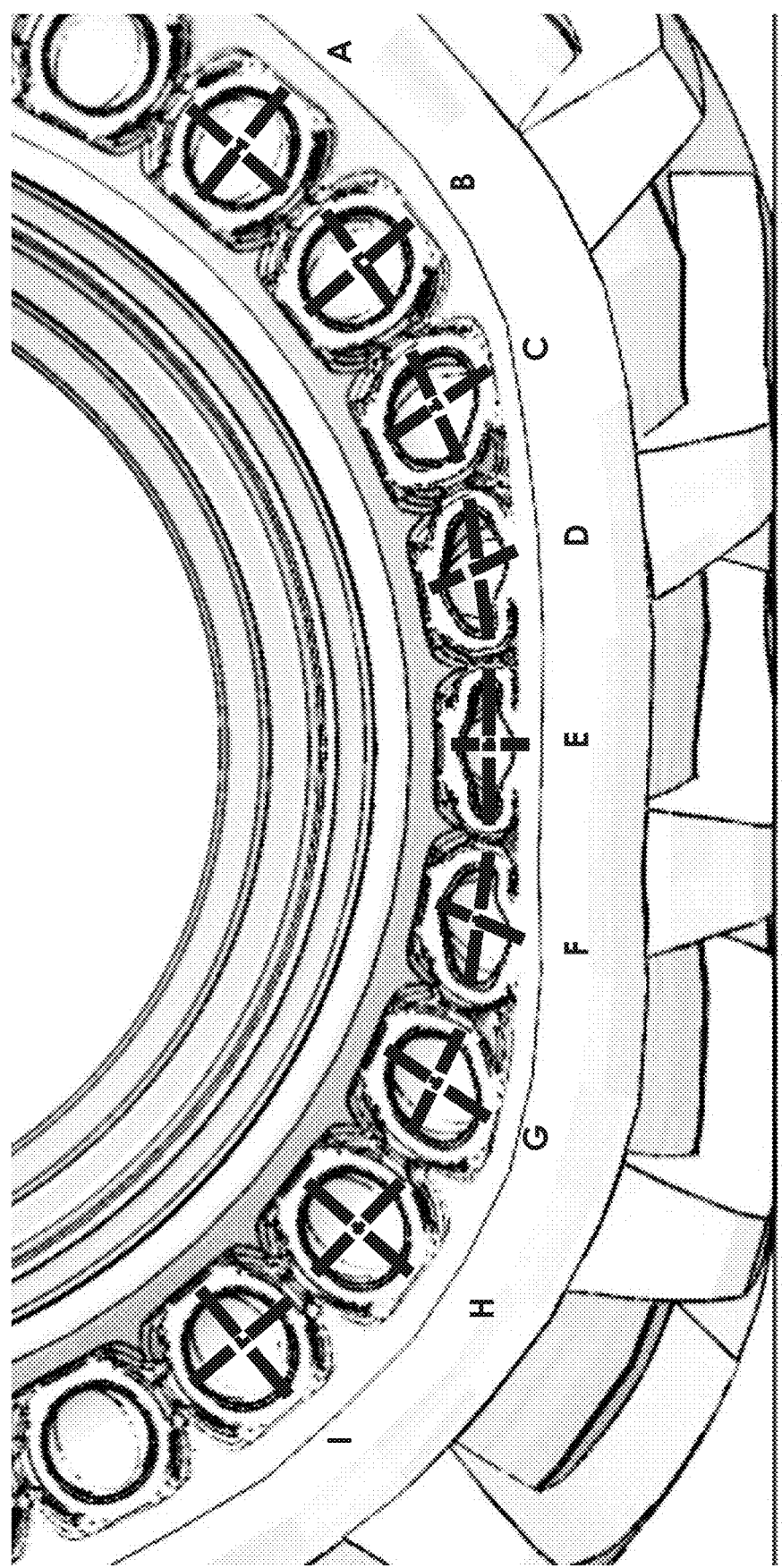
FIG. 7B is an enlarged view of the lower part of FIG. 3B with annotations on a sequence of tubular reinforcing elements spanning a region of deformation of the tire.

FIG. 7B is a partial enlarged view of FIG. 3B in which a sequence of 9 of the tubular reinforcing elements are labeled with letters A-I, and are marked with the same reference lines as shown in FIG. 7A. This sequence may be viewed both as a snapshot of the state of the tire at a given moment while under a load and as a sequence of positions/states through which a single tubular reinforcing element passes during rotation of the tire while under a load. The dynamics of this motion can be better appreciated by noting that, on one hand, the total peripheral length of the tread of the tire is fixed while, on the other hand, the region of the tire tread that is under compressive load is radially closer to the center of rotation and is deformed towards a straight line, resulting in a shorter length of the tread corresponding to a given angular sector. There is therefore a significant differential in linear velocity of the tire material on either side of the annular recess. As illustrated at positions D and F, and to a lesser degree also at positions C and G, this results in a skewing of the 12-to-6 line relative to the radial direction. The 3-to-9 line also roughly follows the contour of the tire deflection, and is therefore not necessarily perpendicular to the radial direction of the tire. The use of tubular reinforcing elements readily accommodates a difference in linear velocity between the adjacent tire portions, providing a sort of rolling motion of the tubular elements and thus preventing grinding or rubbing between the two adjacent tire portions.

The shortened path of the tread through the region of deformation may lead to an excess length of the tread around the tire, and in some conventional tires may lead to kinking of the tread and a reduction in contact area with the ground. In certain implementations of the present invention, kinking of the tread is avoided by allowing stretching of the tire sidewalls so that the tread can extend beyond the unstressed radial dimension to the thread. Here too, the use of tubular reinforcing elements provides advantages, allowing the elements to accommodate also an increase in radius as well as a decrease. Thus, in the case illustrated here, elements A and I are essentially unstressed, and may for example have equal dimensions in the 12-to-6 direction and in the 3-to-9 dimension, while in elements B and H, the 12-to-6 dimension is slightly stretched. The radial dimension returns to roughly its initial size at positions C and G, and is compressed in the range of D, E and F. These capabilities of accommodating both decrease and increase in radial dimensions, and of accommodating skew deformations through a sort of rolling motion, are believed to express the significant advantages of the tubular reinforcement element approach proposed herein.

Figure 6:
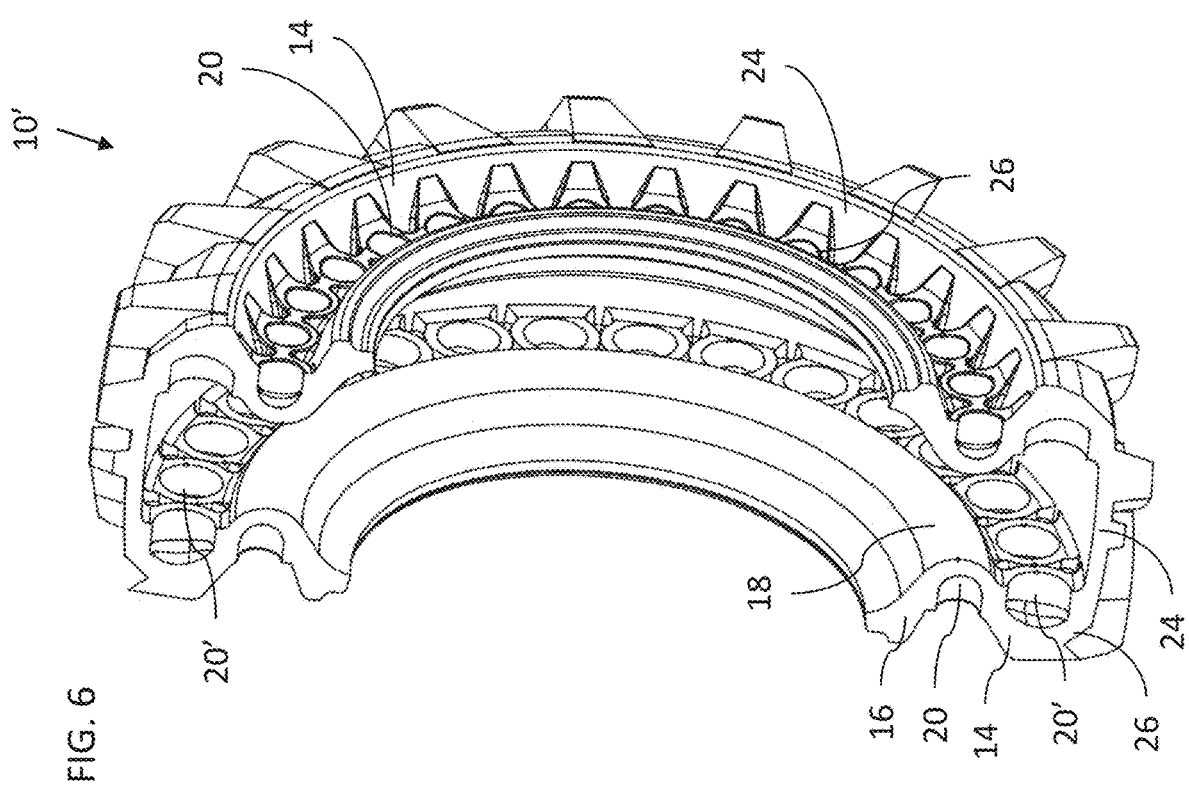
FIG. 6 is a cut-away isometric view of a variant implementation of a tire, constructed and operative according to the teachings of an embodiment of the present invention.

FIG. 6 illustrates a variant implementation of a tire 10' according to the teachings of an aspect of the present invention, where a closure limiting structure similar to that described above is provided as an internal structure within the tire, limiting closure of the outer cone 14 of the tire structure against the outer tread 24 of the tire. In other words, the structure is deployed as a spacer in the region where the outer side of the outer cone 14, at the outer edge of the annular recess, meets the outer tread 24 of the tire, integrally formed at a shoulder portion 26 (which is also a "transition portion" between the partial conical surface 14 and the tread 24. Here too, all the various options and variants described above in the context of the outward-facing closure limiting structure are equally applicable to the internal closure limiting structure, including the various options of the support structure being integrated with the tire body or being a separate component added later. A preferred but non-limiting example of such a structure is illustrated here as a series of inward facing circular cup-like elements (tubular reinforcement elements 20'), analogous to the outward-facing closure limiting structure illustrated above.

Although most preferably used in synergistic combination with the external closure limiting structure, it should be noted that the internal closure limiting structure is a stand-alone feature that may also be used independently in a device which does not include the outward facing closure limiting structure.

Although illustrated in the context of a pneumatic tire, the structures of the present invention may also be implemented in an airless tire, where the closure-limiting structure is the primary structure preventing closure of the V-shaped recess during routine use of the wheel.

As illustrated here throughout, the tubular reinforcing elements most preferably have a closed end integrated with the transition region and an open end.

It will be appreciated that the above descriptions are intended only to serve as examples, and that many other embodiments are possible within the scope of the present invention as defined in the appended claims.

What is claimed is:

1. A tire for rotation about an axis of rotation comprising:
(a) a first wall portion having a partially conical form circumscribing the axis;
(b) a second tire portion have a partially conical form, circumscribing the axis, said first wall portion and said second tire portion being integrally formed with each other and interconnected at a transition region so as to form a sidewall of the tire, said sidewall having an annular recess adjacent to said transition region; and
(c) a closure-limiting configuration comprising a plurality of tubular reinforcing elements within said annular recess, each of said tubular reinforcing elements having a wall with a closed cross-section, said tubular reinforcing elements being circumferentially spaced around said axis within said annular recess such that deformation of a compressed region of the tire under a load causes a change in shape of said tubular reinforcing elements in the compressed region,
wherein, under a first load, a dimension of said tubular reinforcing elements in a circumferential direction of the tire increases in the compressed region of the tire and, during further loading of the tire greater than said first load, further increase in the dimension of said tubular reinforcing elements in the circumferential direction of the tire is opposed by abutment between said tubular reinforcing elements.

2. The tire of claim 1, wherein said tubular reinforcing elements have an extensional direction oriented substantially parallel to the axis of rotation of the tire.

3. The tire of claim 1, wherein each of said tubular reinforcing elements has a closed end integrated with said transition region and an open end.

4. The tire of claim 1, wherein said tubular reinforcing elements in an unstressed state of the tire are substantially cylindrical.

5. The tire of claim 1, wherein a plurality of bridging elements interconnect said tubular reinforcing elements.

6. The tire of claim 1, further comprising:
(a) a tread integrally formed with said first wall portion and interconnected at a shoulder region so as to define a second annular recess adjacent to said shoulder region; and
(b) a second closure-limiting configuration comprising a plurality of tubular reinforcing elements within said second annular recess, each of said tubular reinforcing elements having a wall with a closed cross-section, said tubular reinforcing elements being circumferentially spaced around said axis within said second annular recess such that deformation of a compressed region of the tire under a load causes a change in shape of said tubular reinforcing elements in the compressed region.

7. The tire of claim 1, wherein the tire is integrally formed from reinforced rubber.

8. The tire of claim 1, wherein the tire is a pneumatic tire.

9. The tire of claim 1, wherein the tire is an airless tire.

10. A tire for rotation about an axis of rotation comprising two sidewalls integrated with a tread to define a hollow tire,
   each of said sidewalls comprising a first wall portion having a partially conical form circumscribing the axis,
   said tread being integrally formed with said first wall portion and interconnected with said first wall portion at a shoulder region so as to define an annular recess adjacent to said shoulder region facing inwards towards a hollow of the tire,
   the tire further comprising a closure-limiting configuration comprising a plurality of tubular reinforcing elements within said annular recess, each of said tubular reinforcing elements having a wall with a closed cross-section, said tubular reinforcing elements being circumferentially spaced around said axis within said annular recess such that deformation of a compressed region of the tire under a load causes a change in shape of said tubular reinforcing elements in the compressed region.

* * * * *